United States Patent [19]

Baratto

[11] Patent Number: 5,721,041

[45] Date of Patent: Feb. 24, 1998

[54] ART REPRODUCTION AND METHOD

[76] Inventor: Eugene Louis Baratto, 527 205th Ave., Somerset, Wis. 54025

[21] Appl. No.: 611,062

[22] Filed: Mar. 5, 1996

[51] Int. Cl.$^6$ ............................. B32B 3/00; B32B 31/00; C04B 41/00
[52] U.S. Cl. .................... 428/195; 428/172; 428/200; 428/207; 428/212; 156/242; 156/277; 264/132; 264/134; 264/245
[58] Field of Search ................. 428/172, 67, 200, 428/201, 202, 195, 207, 212, 187, 318.4, 542.2, 913.3, 13; 156/277; 264/132, 134, 245, 241

[56] References Cited

U.S. PATENT DOCUMENTS

| | | | |
|---|---|---|---|
| 3,077,040 | 2/1963 | Stieber et al. | 264/322 |
| 4,001,062 | 1/1977 | Iisaka et al. | 264/132 |
| 4,170,618 | 10/1979 | Adams | 265/101 |
| 4,308,224 | 12/1981 | Becker | 264/24 |
| 4,781,956 | 11/1988 | Zimmerman | 428/43 |
| 4,877,657 | 10/1989 | Yaver | 428/31 |
| 4,971,743 | 11/1990 | Lang | 264/132 |
| 5,182,063 | 1/1993 | Lang et al. | 264/132 |
| 5,201,548 | 4/1993 | Lang et al. | 283/2 |

FOREIGN PATENT DOCUMENTS

| | | |
|---|---|---|
| 1493516 | 7/1967 | France . |
| 1548337 | 10/1968 | France . |
| 448-822 | 12/1967 | Switzerland . |
| 782703 | 9/1957 | United Kingdom . |

*Primary Examiner*—Donald Loney

[57] ABSTRACT

An art reproduction composite having a textured colored sheet having a thermoplastic layer and a color layer laminated to a substrate with an adhesive and optionally including a reinforcing layer. The invention also relates to a method of making art reproductions.

20 Claims, No Drawings

ART REPRODUCTION AND METHOD

FIELD OF THE INVENTION

The present invention relates to art reproductions having three dimensional relief characteristics and to a method of making the art reproductions.

BACKGROUND OF THE INVENTION

Demands for high quality art reproductions, such as oil paintings, acrylic paintings, embroidered tapestries, and the like are increasing as the living standards become higher and the means to afford the reproductions increases. However, it is difficult and costly to make high quality reproductions, especially those that command a high price. Some reproductions are made by hiring an artist to copy an original painting in an attempt to replicate the colors and brush strokes of the original. It is difficult to control the quality of such reproductions and there is a noticeable variation o from one painting to the next. The cost is also prohibitive for most consumers who want a high quality art reproduction at a reasonable price.

Commercially available reproductions made with state of the art techniques lack many of the characteristics desired by the art world. Some of the commercially available fine art reproductions are stiff and boardy and do not simulate the flexibility of a genuine oil painting. This limitation makes the reproductions difficult to handle during stretching and framing, and art galleries and distributors may be reluctant to roll up a single reproduction for shipping in a tube container for fear of damaging the reproduction. When a reproduction on canvas is framed, it is first stretched and mounted onto stretcher bars using nails or staples. The stretched reproduction is then framed. Some of the currently available reproductions have been reported to crack during stretching and stapling, and some crack after they have been mounted on the stretcher bars. Additionally, the boardiness of these reproductions limits the types of shipping containers that can be used for mailing.

Other characteristics desired for art reproductions include good color fidelity, i.e., the colors of the original are faithfully reproduced, and good texture fidelity, i.e., the texture from the canvas and the brush marks or threads of the original are faithfully reproduced. Fine details formed by brush strokes having relatively high relief and sharp angles are particularly difficult to reproduce and maintain using the existing technology. Texture fidelity also requires that the texture is in registration with the color or the image, i.e., the textured areas are correctly aligned with the corresponding colored areas.

In spite of the wide range of art reproductions that are commercially available, reproductions lack some of the desired characteristics. One common type of art reproduction, often referred to as framed art, is a flat colored print on paper of an original painting. This type of print usually has good color fidelity, but lacks any surface texture from the art canvas or the brush strokes. Such textures are widely recognized in the art world as essential to the expression of the artist, and fastidious artists may not permit their works to be copied in this way.

In another type of art reproduction, commonly called print transfers, the texture of the canvas can be imparted to a reproduction by printing an image onto paper, applying a varnish over the printed paper to form a composite, drying the varnish, removing the paper from the back of the composite, and laminating the remaining colored composite onto an art canvas. Reproductions made by this method can suffer from a loss of color fidelity from the original because the print is covered by a relatively thick coating of varnish. These reproductions also lack any texture from brush strokes.

In more expensive reproductions, such as in limited edition prints, there is an expectation that the canvas texture, texture from brush strokes, and the color fidelity of the original painting are faithfully reproduced. Attempts have been made to provide texture simulating brush strokes by thermoforming a printed thermoplastic sheet. Briefly, the process involves printing a thermoplastic sheet, clamping the sheet in a frame over a mold having the desired relief characteristics approximately aligned with the print, heating the sheet to soften it, and then applying a vacuum below the softened sheet to draw it into the mold and impart a relief image to the sheet. It is generally recognized that noticeable distortion of the printed image occurs during this process so that it is impossible to achieve accurate registration of the printed image to the corresponding relief characteristics.

Some attempts have been made to overcome this deficiency by indirect heating of the printed sheet. A thin thermoplastic sheet with a printed image is placed over a mold with the desired relief characteristics. A relatively thick substrate having approximately the same softening temperature as the printed sheet is clamped into a frame above the mold and heated to the softening point. A vacuum is then applied beneath the mold and the thick sheet is pulled onto the thinner sheet and both sheets are pulled into the mold. This method is adequate for low relief with broad peaks, but high relief with sharp peaks would not reproduce well on this method because of the thickness of the heated sheet.

In another attempt to overcome the deficiencies of conventional thermoforming, U.S. Pat. No. 4,308,224 (Becker), describes a process in which a printed thermoplastic sheet is heated on a mold and the weight of the sheet forms the relief. The process is reported to only partially duplicate the relief dimensions of the original artwork, and the texture tended to reduce after standing. Another method is described in U.S. Pat. No. 4,971,743 (Lang), in which high pressure and heat are used to form a laminate having a printed PVC sheet and a substrate. U.S. Pat. No. 5,182,063 (Lang et al.), describes a method of producing texture on a print by embossing the print between male and female complemental embossing dies.

Although art reproductions have been available using the existing technology, the deficiencies have not been overcome to the point of being commercially desirable. There remains an ongoing desire and need for high quality art reproductions that have good color and texture fidelity from one reproduction to another, and that can be stretched and mounted without cracking.

SUMMARY

The invention provides a flexible art reproduction that includes:

(a) a substrate;

(b) a textured colored sheet comprising a color layer and a flexible thermoplastic layer;

(c) a flexible adhesive disposed between the sheet and the substrate so that when the reproduction is stretched, the adhesive and thermoplastic sheet have sufficient elongation to stretch with the substrate without cracking.

In one preferred embodiment the adhesive comprises a pressure-sensitive adhesive, and the flexible thermoplastic layer is a plasticized poly(vinyl chloride) film.

In another preferred embodiment, a reinforcing layer is included.

The invention further provides a method of making art reproductions including the steps of:

(a) providing a mold having relief characteristics and a vacuum outlet attached to a vacuum pump;

(b) providing a thermoplastic film having a first major surface and a second major surface;

(c) printing the first major surface of the thermoplastic film with inks to form a colored thermoplastic sheet having an image corresponding to the relief characteristics of the mold;

(d) positioning the colored thermoplastic sheet on the mold so that the image is in registration with the corresponding relief on the mold;

(e) heating the sheet sufficiently to soften the thermoplastic film so that the colored sheet is drawn into mold relief to form a textured colored thermoplastic sheet;

(d) applying sufficient vacuum to form the corresponding relief on the sheet.

The process optionally includes the step of cooling the sheet sufficiently so that it can be removed from the mold without distortion.

In a preferred embodiment, the process includes the step of applying sufficient vacuum to hold the sheet in place before heating the sheet.

In another embodiment of the invention the method includes the steps of (a) printing a thermoplastic film with a colored image to form a colored sheet having a printed side and an unprinted side;

(b) placing a porous substrate having a textured surface on a vacuum table attached to a vacuum pump;

(c) positioning the colored sheet over the porous substrate with the unprinted side of the sheet on the substrate;

(d) optionally applying sufficient vacuum to hold the sheet in place;

(e) heating the colored sheet sufficiently to soften the thermoplastic film;

(f) applying sufficient vacuum to draw the colored sheet material onto the textured surface of the substrate to form the reproduction having a textured colored sheet and a substrate.

DETAILED DESCRIPTION

The art reproductions of the invention are flexible composites comprising a substrate that is adhesively bonded to a textured thermoplastic sheet comprising at least a color layer and a thermoplastic layer, and an optional reinforcing layer, which is also referred to as a reinforcing sheet.

The flexible art reproductions of the invention can be mounted using conventional methods and materials used for canvas prints without cracking of the reproduction. A canvas print is mounted by centering the print onto a stretcher frame, stapling one side of the print to the frame, and then stretching and stapling the print to the frame. The art reproductions of the invention have sufficient elongation, i.e., stretch, and flexibility so that when they are stretched during mounting, they will not crack. When the reproduction is stretched at a speed of 5 inches per minute, the entire composite stretches to the breaking point without cracking. Typical elongations of the inventive composites are greater than about 40% and generally at about least 60%. In a preferred embodiment, the stretch is greater than 100%. Elongation is defined as the mount that a strip of the composite stretches before breaking. For example, a 2 inch long strip that stretches to 2.5 inches before breaking has a stretch of 25%. Lower elongations can occur with composites having substrates or reinforcing layers with low elongation, but the adhesive and the thermoplastic layer are sufficiently extensible to stretch without cracking without wishing to be bound by theory, it is believed that during stretching, the canvas may be stretched on a bias or some other angle instead of squarely along the thread lines. If a reproduction is stiff or brittle, stresses from stretching will cause cracking in the reproduction. When the components of the reproduction are flexible and can elongate when stretched, the stresses from stretching are alleviated and cracking is avoided.

Additionally, the art reproductions are sufficiently flexible so that reproductions measuring 24 inches by 36 inches can be rolled and inserted into tubular shipping containers measuring from 4 inches in diameter down to 1.5 inch in diameter. The reproductions can be aged in the tubular containers at 130 F. for at least one day without taking a permanent set or cracking. A permanent set is a curvature or bow which cannot be flattened out when the reproduction is stretched on stretcher bars.

In the practice of the invention, the substrate serves as the carrier of the art reproduction. Useful substrates include woven and nonwoven fabrics, papers, and polymeric films. Substrates can also include masonite and paperboard if flexibility is not needed for mounting. Preferably, the substrates are woven and nonwoven fabrics, polymeric films, and papers. In a highly preferred embodiment, the substrate is a woven fabric which can impart a canvas-like texture to the art reproduction. The fabrics can be made from natural fibers such as silk, linen, and cotton, or synthetic fibers such as polyester, nylon, acetate, rayon, polypropylene, and the like. The fabrics can be sized or coated with a suitable material such as starch or poly(vinylalcohol) to impart various characteristics such as stiffness to the cloth. A preferred substrate is artist canvas which is a duck cloth commercially available at retail art supply stores.

The substrate is adhered to the colored sheet with an adhesive. Preferably, the adhesive is flexible. Useful adhesives include but are not limited to, heat activatable adhesives which are non-tacky at room temperature but become tacky upon heating, pressure-sensitive adhesives, water and solvent based laminating adhesives, and the like. Suitable adhesives include acrylic adhesives, block copolymer adhesives, poly(urethane) adhesives, poly(ethylene vinyl acetate) adhesives, poly(vinyl acetate) adhesives, and the like.

A particularly useful class of adhesives is pressure-sensitive adhesives. These adhesives are tacky at room temperature and can be selected to adhere well to most materials. Typical pressure-sensitive adhesives are viscoelastic polymers having a storage modulus between about $10^3$ to $10^7$ dynes/square centimeter and a glass transition temperature of less than about 0 C. Preferably, the adhesives have a storage modulus between about $10^3$ to $10^6$ dynes/square centimeter.

Acrylic pressure-sensitive adhesives are preferred because of their excellent aging properties, clarity, and resistance to aging. They are commercially available in various forms which include, but are not limited to water borne latexes, solvent based adhesives, spray adhesives, and flee films or transfer tape. Examples of useful commercial pressure-sensitive adhesives are adhesive transfer tapes sold by Minnesota Mining & Manufacturing Company, St. Paul Minn., under the SCOTCH trademark, spray adhesives, available from Minnesota Mining & Manufacturing Company under the 3M trademark, and various acrylic pressure-sensitive adhesive from Rohm & Haas.

The adhesive can be disposed between the sheet and the substrate by several methods: coating adhesive onto the substrate; coating the back side of the colored sheet, i.e., the unprinted side with adhesive; or both. The adhesive can also be provided as a free film which is laminated to either the substrate or the back side of the colored sheet.

In the practice of the invention, flexible adhesives are useful in bonding thermoplastic sheets to substrates that can be more or less rigid than the sheets. Without wishing to be bound by theory, it is believed that the viscoelastic nature of a the adhesive, and in particular in a pressure-sensitive adhesive, allows a fairly rigid sheet to be adhesively bonded to a flexible substrate, or a fairly flexible sheet to be adhesively bonded to a stiffer substrate, while maintaining the overall flexibility of the art reproduction composite. During stretching and mounting of the art reproduction, it is believed that the pressure-sensitive adhesive deforms sufficiently to alleviate the stresses caused during stretching of more rigid materials which may lead to cracking of the reproduction. The adhesive also stretches with the substrate and sheet so that inherent stresses are alleviated. Composites that are fused or welded together may not possess sufficient flexibility to alleviate the stresses during stretching.

The colored sheet of the invention comprises a thermoplastic layer and a printed color layer that is also thermoplastic. By thermoplastic, it is meant that the material exhibits plastic deformation or flow when heated. As used herein, the thermoplastic layer may also be referred to as a thermoplastic film. Useful materials for the thermoplastic layer include, but are not limited to plasticized polyvinyl chloride (PVC), rigid polyvinyl chloride, polystyrene, ethylene vinyl acetate copolymers, polyvinyl alcohol copolymers, acrylic copolymers, polyester, and nylon. Preferred materials for the thermoplastic layer include plasticized polyvinyl chloride, semi-rigid polyvinyl chloride, and polyesters such as PETG, a glycol-modified poly (ethyleneterephthalate) resin available from Eastman Chemical Co. More preferably, the materials for the thermoplastic layer are plasticized polyvinyl chloride, and semi-rigid polyvinyl chloride.

Polyvinyl chloride films are supplied with varying degrees of stiffness referred to as "hand" in the industry, and having varying amounts of plasticizer. The stiffness ranges from hard to semi-rigid to soft with softer PVC having more plasticizer. According to the industry measurements, a hand of about 24 is a soft PVC. A hand ranging between about 12 to 17 is referred to as semi-rigid, while lower numbers are used to describe harder polyvinyl chloride films having little or no plasticizer. In the practice of the invention, PVC films having a hand greater than about 10 are preferred. A hand is greater than about 18 is preferred where very flexible art reproductions are desired.

The thermoplastic film or layer is sufficiently thin to provide a flexible finished art reproduction composite comprising the textured colored sheet, the adhesive, and the substrate, but thick enough to be handled easily in the manufacturing process. Suitable thickness of the film range from about 0.0005 inch to about 0.015 inch, preferably from about 0.001 inch to about 0.010 inch, and more preferably from about 0.003 inch to about 0.009 inch, and most preferably from about 0.0035 to 0.008 inch.

The useful thickness of the materials for the thermoplastic film varies somewhat with the type of material from which the sheet materials are made. For example, a rigid PVC film is rigid at thicknesses greater than about 0.010 inch while a soft PVC film may still have the requisite flexibility at a thickness of 0.015 inch or even 0.020 inch. It has been found that thinner films, i.e., less than about 0.010 inch thick, are more suitable for replicating very fine texture where the relief is relatively high, and the peaks are sharp. In particular, thinner films provide better definition and detail when they are thermoformed in deep narrow draws, in which the depth or length o of the draw into the mold can be several times greater than the width of the draw. Draws up to 0.25 inch long have been achieved using 0.006 inch thick films. Very deep draws may require thicker layers of printing ink to prevent the loss of color fidelity.

Suitable commercially available thermoplastic films include vinyl labelstock such as that available from FLEXcon Company, Inc., Spencer, Mass., under the FLEXMARK trademark. The thermoplastic film can be treated to improve its printing qualities by treatments which include, but are not limited to, corona treatment, coatings, and chemical primers. Treatments can be provided on the film by the manufacturer.

In a preferred embodiment, the thermoplastic films are provided with a pressure-sensitive adhesive. In a highly preferred embodiment, the thermoplastic layer is a printable thermoplastic film provided on a release liner with a pressure-sensitive adhesive disposed between the liner and the sheet material. Suitable liners include kraft paper, poly (ethylene) coated kraft paper, oriented polyester film, and oriented polypropylene film. The liner protects the adhesive during processing and also supports the thermoplastic film during printing. The liner material is preferably a dimensionally stable material, such as a heavy kraft paper or a biaxially oriented polyester film. In practice, the liner provides sufficient support to the sheet material during the printing process so the sheet material is not stretched. Stretching of the thermoplastic film during printing will result in uncontrollable distortion in the image so that one print varies from another. During thermoforming, the variation causes difficulty in registration of the image with the relief since the mold is fixed.

A commercial example of a preferred film construction is FLEXMARK V-600-FW TC-160 V-23 90 PFW by FLEXcon Company, Inc. The construction is a 0.006 inch thick topcoated vinyl film having an acrylic pressure-sensitive adhesive with a thickness of about 0.001 inch on a 0.0067 inch thick paper release liner.

The thermoplastic layer or film is printed to provide a colored sheet, i.e., a printed sheet, having a thermoplastic layer and a printed or colored image layer. Printing can be done with the state of the art permanent printing inks using existing processes and equipment. Preferably, the inks are compounded in a thermally stable binder for heat resistant during the thermoforming, are fast drying during the printing process, and are permanent. The inks can be printed by well-known printing processes which include rotogravure, offset lithography, continuous tone lithography, photographic printing, screen printing, and the like. Continuous tone lithography is useful for very high quality prints that require replication of the rich colors and sharp definition of the details of the original painting.

In the preferred method of the invention, a printable thermoplastic film is provided on a release liner with a pressure-sensitive adhesive disposed between the liner and sheet material. The thermoplastic film on the liner is printed according to any of the above described methods.

The printed sheet, supported by the liner, is then positioned with the printed or colored side down and facing a relief mold bearing the desired three-dimensional texture for the art print so that the sheet is in direct contact with the mold. The printed sheet can be registered using registration marks, which are typically and X in at least two areas of the sheet, to align the colored areas of the print with the appropriate relief areas of the mold. A vacuum is preferably applied to the mold to hold the printed sheet in place, although other means of holding the sheet onto the mold can also work. This step of placing the printed sheet in direct contact with the mold maintains the correct alignment of the sheet so that after thermoforming, the relief characteristics correspond with the correct colored areas. Optionally, the sheet can be further affixed to the mold by a conventional fastening means such as taping the edges or using mechanical clamps to hold the edges onto the mold as long as the sheet is in contact with the mold. The sheet, with the liner still in place, is then heated on the liner side by a heat source such as radiant heaters or quartz heat lamps to a temperature below the melting temperature but above the softening temperature of the thermoplastic material. A vacuum is then applied to draw the image into the relief mold. In a preferred embodiment, the vacuum is applied before heating, and during heating of the sheet, the vacuum draws the registered colored sheet into the mold crevices to provide a textured surface to the colored sheet. The temperature is maintained for a sufficient time to provide the desired amount of relief to the colored sheet, and the lamps are then turned off. After cooling to a temperature less than about 150 F., the fastening means are removed, and then the liner is removed to expose the adhesive. While the colored sheet is still in the mold, and with the vacuum still running, the substrate is laminated onto the back of the art print with light pressure. This can be done with a roller or a squeegee. The sheets may also be removed from the mold after thermoforming; slight distortions may occur in the sheet but are not particularly noticeable since the printing and the texture are in registration.

Without wishing to be bound by theory, it is believed that as heat is applied, the colored film is drawn into the mold crevices before the film distorts and registration is lost. In conventional thermoforming, the edges of a thermoplastic film are clamped above a mold and the film is heated to a softening or near-molten temperature. During this time, the film visibly expands, shrinks, and moves, which leads to misalignment of the image to the texture in the mold.

When more rigid thermoplastic films that are not coated with pressure-sensitive adhesives are used for printing, it may be unnecessary to use a liner because the rigid films have sufficient strength to resist stretching and distortion.

When there are deep draws in the printed sheet from thermoforming, it may be desirable, although optional, to backfill parts or all of the sheet with a flexible polymeric material before the substrate is laminated. This prevents collapsing of the relief details at a later time. Materials that can be used to backfill the thermoformed colored sheet include urethane resins, polyester resins, epoxy resins, spackling compounds, flexible plasters, and the like. A suitable material is RED DEVIL Spackling Compound which is commercially available at various retail hardware stores. If the sheet is backfilled, adhesive can be applied over the backfilled areas to ensure good lamination of the sheet to the substrate.

After the substrate has been laminated to the thermoplastic sheet, the vacuum is turned off, and the finished art reproduction comprising the substrate, the adhesive, and the colored sheet, is cooled, and then removed from the mold.

A clear protective coating or a gloss control clear coat can further be applied to the laminated three dimensional reproduction. Gloss control clear coats can be applied to provide matte or high gloss appearances to the reproduction as desired. Optional protective coatings can be used to provide scuff resistance, protection from ultraviolet light absorption, protection from dust, and the like. Suitable coatings are commercially available at retail art supply stores.

The finished art reproduction can be mounted onto stretchers and framed using standard methods used in the industry. The art reproductions of the invention can be provided with a colored sheet that is smaller than the dimensions of the substrate so that only the substrate is stretched and mounted onto the frame. The reproductions can also be provided with the colored sheet having the same dimensions as the substrate. In this case, the entire art reproduction composite would be stretched and mounted.

In some instances it is desirable to reinforce the art reproduction composite to further stabilize the composite, to stabilize the texture on the composite, and to cushion the composite during stapling when the composite is mounted on the stretcher. The reinforcing sheet can be included between the colored sheet and the substrate, or it can be bonded to the substrate after the substrate has been bonded to the colored sheet. Reinforcing is preferably accomplished by adding a reinforcing sheet between the colored sheet and the substrate after the colored sheet has been thermoformed or texturized, and before the substrate has been laminated. Useful reinforcing sheets have adequate tensile strength and elongation to withstand the stresses in the composite resulting from stretching. Useful sheets include, but are not limited to, kraft papers, saturated papers, polymeric films such as polyester and polypropylene films, microporous films, metal foils, and fabrics. Preferred materials include saturated papers, polymeric films such as polyester and polypropylene films, microporous films, and metal foils. Particularly suitable reinforcing materials include latex saturated moisture resistant papers such as those available from Kimberly Clark Corp., breathable moisture vapor transmissive films such as the perforated polyester films available from Transilwrap, and microporous films such as microporous high density polyethylene that is available from PPG Industries under the TESLIN™ trademark.

In the preferred practice, after thermoforming the colored sheet, the reinforcing sheet is adhesively laminated to the colored sheet while the sheet is in the mold and while the vacuum is still running. The substrate is then laminated to the reinforcing sheet while the reproduction is still under vacuum in the mold using a suitable adhesive. Alternatively, the laminate, comprising the colored sheet and the reinforcing sheet, can be removed from the mold and laminated to a substrate at a later time. Suitable adhesives for laminating include those described above. A preferred adhesive is a spray adhesive such as "3M 77 Spray Adhesive" available from Minnesota Mining & Manufacturing Co.

Relief molds useful for thermoforming are well known and can be made from various materials including metals and porous metal composites, filled and unfilled polymeric resin composites, foamed composites, ceramics, and ceramic composites. Specific materials that are useful include epoxy or urethane resins filled with glass bubbles, beads, silica and the like; silicone rubbers, unfilled or filled with silica, calcium carbonate, and the like; and fabric reinforced epoxy resin composites. Methods of making molds are also well known and include, for example, those methods described in GB 782,703, and U.S. Pat. No. 4,308,224.

Preferably, the molds are porous. Porosity can be introduced into the molds by means known in the art such as by machining the mold in areas where there are valleys in the mold to provide channels for air to be drawn out; by perforating molded composites; and by adding materials such as glass bubbles to make porous composites. In areas where there is a deep draw, it may be useful to perforate the bottom of the valley in a mold to ensure sufficient draw to achieve the desired texture. Textures in molds can be enhanced or created by mechanically or chemically machining or etching the mold surface to provide the desired surface textures. The molds can be coated with metal, such as by electroplating, or other hard coatings to increase the life of the molds. Release coatings, such as silicones or fluorocarbons can also be used to coat the mold surface to aid in removal of the finished art reproduction from the mold.

As an illustration of a non-limiting specific embodiment, a colored sheet was prepared by printing a colored image on a 0.006 inch thick topcoated vinyl film having an acrylic pressure-sensitive adhesive with a thickness of about 0.001 inch on a 0.0067 inch thick release liner (FLEXMARK V-600-FW TC-160 V-23 90 PFW by FLEXcon Company, Inc.). The printing was done by continuous tone lithography with standard permanent lithographic printing inks to produce a multi-colored image on the film.

The resulting colored sheet, with the liner still attached, was cut into a rectangle measuring 19 inches by 23 inches with the approximately image centered and with registration marks. This would provide a finished reproduction measuring 16 inches by 20 inches. A mold having three dimensional relief characteristics corresponding to desired texture in the print was placed on a thermoforming table and attached to a vacuum pump. The printed sheet was then positioned over the mold with the colored side facing the mold and with the relief areas of the mold in registry with the corresponding colored areas of the printed sheet. Registration was achieved by aligning two of the registration marks on the sheet with pins on the mold. A vacuum of approximately 15-25 inches of mercury was then applied to the mold to hold the sheet in place. The edges of the sheet were then taped to the mold with a film packaging tape and the table was positioned under a bank of nine 1500 Watt quartz infrared lamps positioned about 8 inches from the surface of the liner of the printed sheet for 1.5 minutes. During this time the printed sheet was drawn into the mold and acquired the relief characteristics of the mold to form a textured colored sheet. After cooling to about 100 F. the tape, and then the liner were removed while the vacuum was maintained on the sheet. A sheet of artist canvas (#10 Duck Canvas available at retail art supply stores) measuring 19 inches by 23 inches was then pressed onto the pressure-sensitive coated side of the textured colored sheet while the sheet was still under vacuum in the mold. After laminating the canvas to the textured sheet, the composite was carefully removed from the mold and the edges were trimmed. The resulting art reproduction was flexible and had excellent color retention and fidelity as well as excellent relief characteristics that were in perfect registry with the color.

The art reproduction was tested by rolling the reproduction into a roll and inserting it into a cardboard shipping tube having a diameter of 2 inches. The reproduction was then aged for 30 days at room temperature (about 21 C.), and for 3 days at 130 F. and cooled to room temperature. When the reproduction was removed from the tube, it maintained its flexibility, was easily flattened out during stretching, and exhibited no signs of cracking.

In a less rigorous test, the art reproduction was rolled and inserted into a 3 inch diameter tube and aged for 3 days at 130 F., and cooled. The art reproduction exhibited no cracks or loss of flexibility. The art reproduction also passed tests of aging in a 3 inch diameter tube at 130 F. for one day (24 hours), and in a 4 inch diameter tube and at 130 F. for one day.

The art reproduction was flexible enough to provide easy handling and mounting. A piece of the art reproduction was also folded on itself 20 times with the colored side out, and creased with heavy finger pressure. The reproduction did not exhibit any cracking. An art reproduction of the invention was stretched and stapled using conventional techniques. No signs of cracking were noted during stretching and mounting. When a narrow strip of the art reproduction was stretched, the entire composite comprising the colored thermoplastic sheet, the flexible adhesive, and the substrate stretched until the substrate broke. The elongation of the strip was about 160%. Various samples of the inventive composite had elongations from about 100% to over 160%. In general, the inventive composites stretched to the breaking point of the cloth or the reinforcing sheet without cracking. If the cloth or reinforcing sheet as a relatively low elongation, the elongation of the composite will be low, but the entire composite will stretch without cracking.

In another embodiment of the invention, the colored sheet was prepared as described above to the point of removing the tape and liner from the textured sheet. Then a sheet of 14 Point TESLIN (0.014 inch thick microporous high density polyethylene) available from PPG Industries, was laminated to the colored sheet by hand while it was still under vacuum in the mold. Then a spray adhesive "3M 77 Spray Adhesive" available from Minnesota Mining & Manufacturing Co.) was sprayed onto the microporous film and a piece of #10 Duck Canvas was laminated to the microporous film to form a textured art reproduction. The reproduction was carefully removed from the mold and cooled. After trimming the edges, the microporous film was found to reinforce the art reproduction during stretching and mounting. The reproduction maintained much of the flexibility of the unreinforced composite and could be rolled and inserted into 2 inch, 3 inch and 4 inch diameter tubes.

In an alternative embodiment of the invention, the mold is the porous substrate and the texture is provided by the surface of the substrate. A particularly useful porous substrate is woven cloth such as a sheet of #10 Duck Canvas which can be placed in the flat cavity of a vacuum-thermoforming table. In this embodiment, a printed, colored sheet is positioned with the printed side up and the unprinted side down and facing the canvas or substrate. A vacuum is applied and after heating to the softening temperature of the thermoplastic sheet, the colored sheet is drawn down into the canvas which imparts the texture of the canvas through the thickness of the thermoplastic sheet to the colored surface. Preferably, there is an adhesive disposed between the canvas and the unprinted side of the colored sheet to provide a bond between the substrate and the colored sheet. The above described FLEXMARK adhesive coated vinyl film is particularly suitable for this embodiment.

Alternatively, with this embodiment, the thermoplastic sheet can be heated first, and then a vacuum is applied after the thermoplastic sheet has reached its softening point because registration is not particularly critical.

Numerous modifications and variations are possible within the scope of the foregoing specification without departing from the invention which is defined in the following claims.

What is claimed is:

1. An art reproduction comprising a substrate, a textured colored sheet comprising a color layer and a flexible thermoplastic layer, and a flexible adhesive disposed between the substrate and the sheet, wherein the color layer of the sheet is exposed, and the thermoplastic layer of the sheet is laminated to the substrate, and wherein said reproduction has sufficient elongation so that when it is stretched, the adhesive and thermoplastic sheet elongate with the substrate to the breaking point of the substrate, and the reproduction does not crack.

2. An art reproduction according to claim 1 wherein the flexible sheet is plasticized poly(vinyl chloride).

3. An art reproduction according to claim 1 wherein the adhesive has a storage modulus of $10^3$ to $10^7$ dynes per square centimeter.

4. An art reproduction according to claim 1 wherein the adhesive is an acrylic pressure-sensitive adhesive.

5. An art reproduction according to claim 1 wherein the thermoplastic layer has a thickness between about 0.001 and 0.010 inch.

6. An art reproduction according to claim 1 wherein the thermoplastic layer has a thickness of between about 0.003 and 0.009 inch.

7. An art reproduction according to claim 1 further comprising a reinforcing layer wherein the reinforcing layer is disposed between the substrate and the textured colored sheet so that the colored layer of the sheet is exposed, or the reinforcing layer is laminated to a first surface of the substrate and the textured colored sheet is laminated to a second surface of the substrate so that the colored layer of the sheet is exposed.

8. The art reproduction of claim 7 wherein the reinforcing layer comprises a microporous polymeric film.

9. A method for making an art reproduction comprising the steps of:
   (a) providing a mold having relief characteristics and a vacuum outlet attached to a vacuum pump;
   (b) providing a thermoplastic film having a first major surface and a second major surface;
   (c) printing the first major surface of the thermoplastic film with inks to form a colored thermoplastic sheet having an image corresponding to the relief characteristics of the mold;
   (c) positioning the colored thermoplastic sheet in contact with the mold so that the image is in registration with the corresponding relief on the mold;
   (d) heating the sheet sufficiently to soften the thermoplastic film so that the colored sheet is drawn into mold relief to form a textured colored thermoplastic sheet;
   (e) applying sufficient vacuum to draw the film into the mold relief.

10. The method of claim 9 wherein the thermoplastic film has a layer of adhesive adhered to the second major surface.

11. The method of claim 10 wherein the adhesive is a pressure-sensitive adhesive.

12. The method of claim 10 wherein the adhesive is adhered to a liner.

13. The method of claim 9 further including the step applying vacuum to hold the sheet in place on the mold before heating the sheet.

14. The method of claim 9 further including the step of bonding a substrate to the sheet with an adhesive while the sheet is under vacuum in the mold.

15. The method of claim 14 further including the step of bonding a reinforcement sheet to the textured colored sheet while the sheet is under vacuum in the mold.

16. The method of claim 9 wherein the thermoplastic film has a thickness less than about 0.020 inch.

17. A method of making an art reproduction comprising the steps of:
   (a) printing a thermoplastic film with a colored image to form a colored sheet having a printed side and an unprinted side;
   (b) placing a porous substrate having a textured surface on a vacuum table;
   (c) positioning the colored sheet over the porous substrate with the unprinted side of the sheet on the substrate;
   (d) optionally applying sufficient vacuum to hold the sheet in place;
   (e) heating the colored sheet sufficiently to soften the thermoplastic film;
   (f) applying sufficient vacuum to draw the colored sheet material onto the textured surface of the substrate to form the reproduction having a textured colored sheet and a substrate.

18. The method of claim 17 wherein an adhesive is disposed between the substrate and the colored sheet.

19. The method of claim 18 wherein the adhesive is a pressure-sensitive adhesive.

20. The method of claim 17 wherein the substrate is a woven fabric.

* * * * *